United States Patent
Street

(10) Patent No.: US 7,181,953 B1
(45) Date of Patent: Feb. 27, 2007

(54) MOISTURE DETECTOR ASSEMBLY

(75) Inventor: Paul T. Street, Elk River, MN (US)

(73) Assignee: Tescom Corporation, Elk River, MN (US)

( * ) Notice: Subject to any disclaimer, the term of this patent is extended or adjusted under 35 U.S.C. 154(b) by 0 days.

(21) Appl. No.: 11/253,498

(22) Filed: Oct. 19, 2005

(51) Int. Cl.
*G01N 19/10* (2006.01)
*F16K 25/02* (2006.01)

(52) U.S. Cl. ............ 73/29.05; 73/29.02; 73/29.03; 73/29.04; 73/335.04; 137/505.25; 137/505.28

(58) Field of Classification Search .... 73/29.01–29.05, 73/335.01–335.05, 431, 866.5; 137/269, 137/505.25, 505.28
See application file for complete search history.

(56) References Cited

U.S. PATENT DOCUMENTS

| | | | | |
|---|---|---|---|---|
| 3,041,878 A | * | 7/1962 | McInroy | ............ 73/29.02 |
| 3,498,116 A | | 3/1970 | Snelson | |
| 4,589,971 A | | 5/1986 | Mayeaux | |
| 5,414,361 A | * | 5/1995 | Ohmi et al. | ............ 324/439 |
| 5,419,177 A | | 5/1995 | Pastorello | |
| 6,056,006 A | * | 5/2000 | Hagerty | ............ 137/269 |
| 6,155,258 A | * | 12/2000 | Voege | ............ 128/205.21 |
| 6,615,865 B1 | * | 9/2003 | Eusebi | ............ 137/557 |
| 6,657,198 B1 | | 12/2003 | May | |

* cited by examiner

*Primary Examiner*—Herzon Williams
*Assistant Examiner*—David A. Rogers
(74) *Attorney, Agent, or Firm*—Clayton R. Johnson

(57) ABSTRACT

The moisture detector assembly includes a moisture detector having a probe extending into a housing bore to have fluid flow in contact with the probe and exiting through a housing bore orifice. A pressure regulator is mounted to the housing with its outlet opening to the housing bore. The regulator includes a cap closing the regulator bore opposite the outlet to provide a main chamber and has an inlet and a piston extending within the regulator bore to control fluid flow from the inlet to the outlet. The regulator outlet is an orifice for limiting fluid flow from the regulator bore to the housing bore. The piston enlarged head and the opening of outlet toward the head provides a control chamber in the regulator bore with the pressure therein controlling the movement of the piston between fluid flow blocking and fluid flowing positions.

20 Claims, 4 Drawing Sheets

MOISTURE DETECTOR ASSEMBLY

BACKGROUND OF THE INVENTION

This invention is for a moisture detector assembly that is usable for detecting moisture in gases that are contained in vessels, for example, bottles or cylinders or tanks containing gas under high pressure.

For many uses, it is necessary to test the moisture content in bottled (cylinders) of gas or other sources of fluid under high pressure. More accurate measurements of moisture content is achieved at or near atmospheric pressure and a low flow rate. Further, it is desirable that a minimum volume of gas flows out of the bottle or cylinder when making the measurement and the moisture detector be easily portable so that a minimum amount of movement of the bottles or other vessels is required, particularly when a number of bottles are stored in a rack.

In U.S. Pat. No. 3,498,116 to Snelson there is disclosed a pressure regulator in fluid communication with a moisture detector while U.S. Pat. No. 6,657,198 to May discloses using a regulator in a system for detecting moisture in a pipeline for natural gas. U.S. Pat. No. 4,589,971 to Mayeaux discloses a pressure regulator and an analyzer for detecting moisture.

In order to make improvements in moisture detector assemblies, particularly for those to be connected to pressure gas cylinders, this invention has been made.

SUMMARY OF THE INVENTION

For measuring moisture in a gas, a moisture detector has its probe extended in a housing bore with a pressure regulator being mounted to the housing and is connectable to be in fluid communication with a source of fluid under high pressure. There is an annular clearance in the housing that surrounds the probe with the fluid exhausting from the annular clearance through the housing bore orifice while the fluid from the pressure regulator flows through an a second orifice to the annular clearance space.

One of the objects of this invention is to provide new and novel means for fluidly connecting a source of fluid under pressure to flow in contact with a moisture detector probe and exhausting the fluid that has passed in contact with the probe. Another object of this invention is to provide new and novel moisture detector apparatus that is of a relative small construction for measuring the moisture content of a fluid under relatively low pressure that is discharged through a regulator from a source of fluid under high pressure. In furtherance of the last mentioned object, it still another object to provide new and novel apparatus that can provide an accurate measurement of the moisture content of gas with only a small quantity of gas being used to obtain the measurement. A further object of this invention is to provide new and novel means in a moisture detector assembly that easily permits the adjustment of the range of fluid flow through the assembly.

DESCRIPTION OF THE PREFERRED EMBODIMENT

Figure 1:
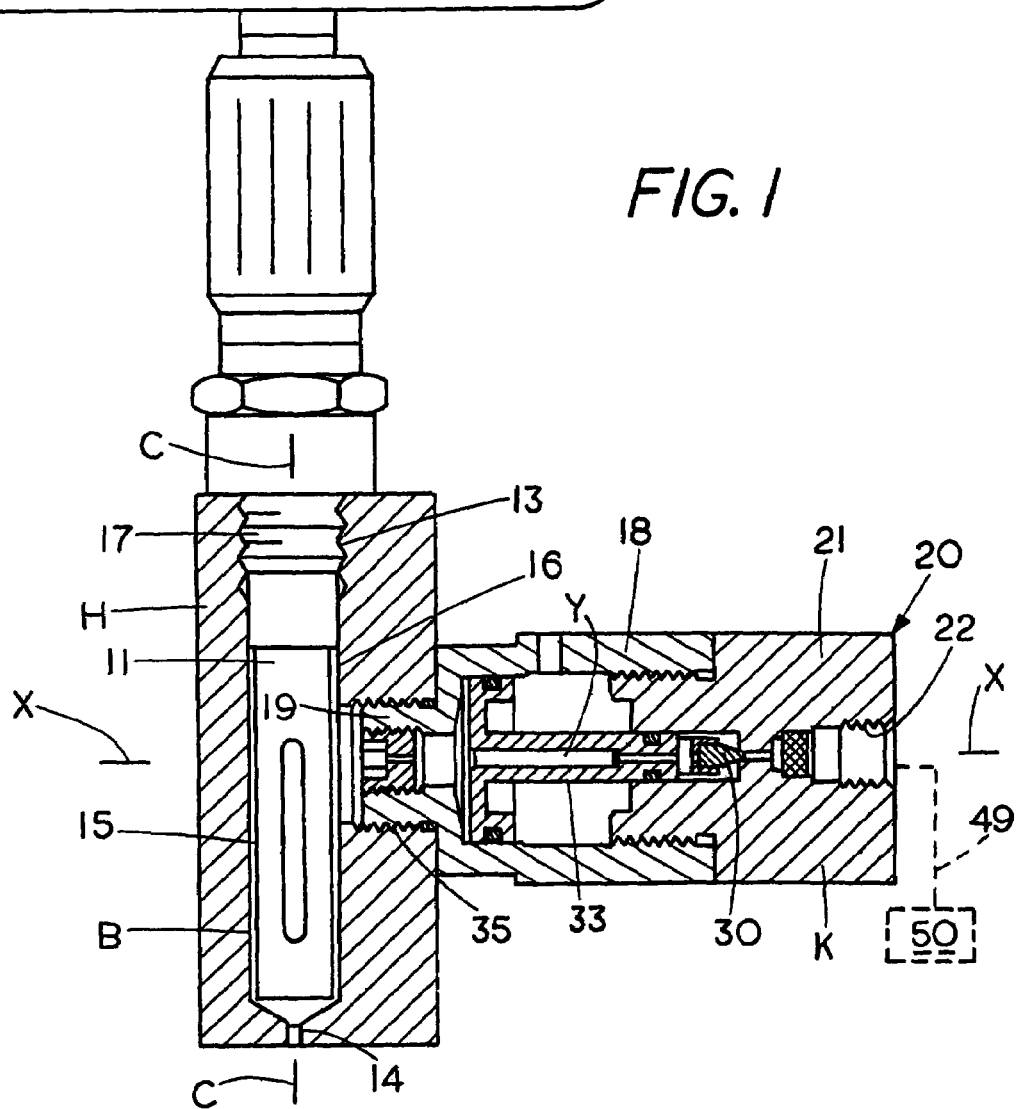
FIG. 1 is a cross sectional view of the first embodiment of the moisture detector assembly.
Figure 2:
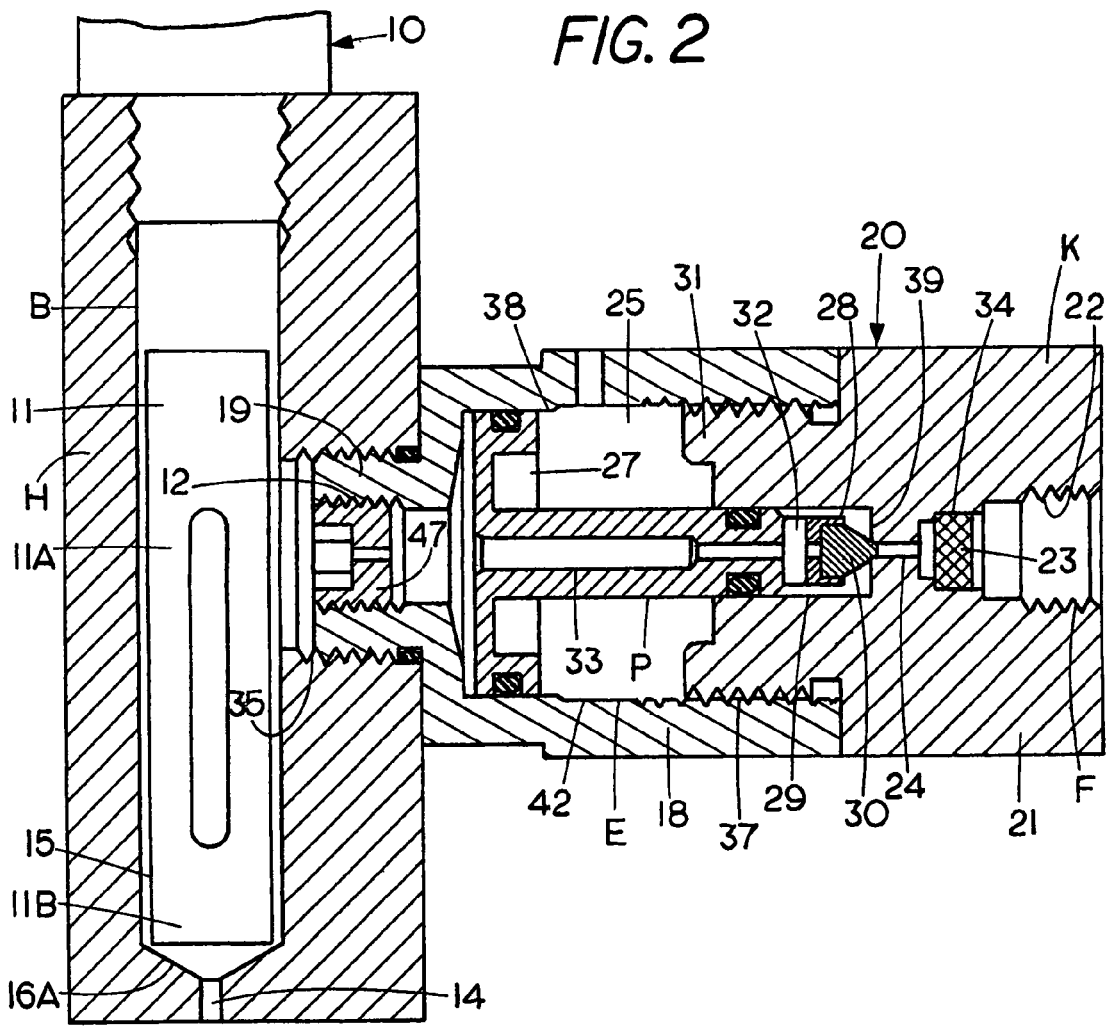
FIG. 2 is an enlarged fragmentary portion of FIG. 1.
Figure 3:
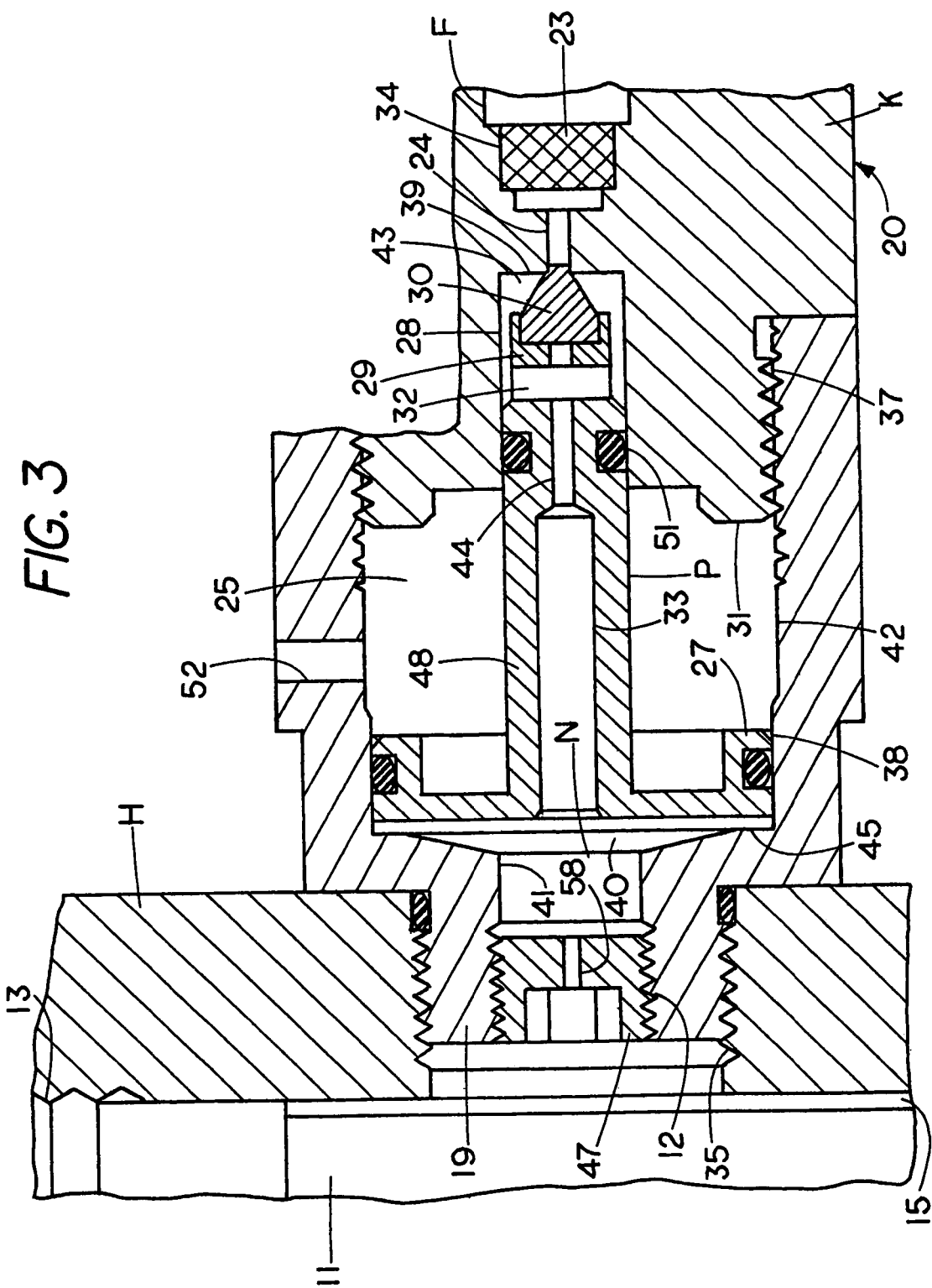
FIG. 3 is an enlarged fragmentary portion of FIG. 2.

Referring to FIGS. 1 and 2 of the drawings, the first embodiment of the moisture detector assembly includes a convention moisture detector (sensor), generally designated 10, having an elongated probe 11 for detecting and measuring the moisture content of a fluid flowing in contact with and around the probe. The probe is extended into bore B of the housing H, the housing bore having a central axis C—C and being axially elongated. The detector has a threaded portion 17 that is threaded into one end portion 13 of the housing bore while the opposite end of the bore B provides a small diameter outlet orifice 14. An axial intermediate portion 16 of the housing bore together with the probe provides an axially elongated annular clearance space 15 that opens through a frustoconical bore portion 16A of the housing bore to the outlet orifice 14. The probe has a terminal end portion 11B closely adjacent to the frustoconical bore portion 16A. The transverse area of the annular clearance space is substantially larger than the corresponding area of the orifice.

The axial-intermediate portion of the clearance space 15 opens to a housing threaded aperture 35 into which one end portion 19 of regulator body 18 of a pressure regulator, generally designated 20, is threaded. The threaded aperture 35 opens to the clearance space 15 more closely adjacent to the housing threaded portion 13 than to the orifice 14 with the clearance space extending axially in opposite axial directions away from the aperture 35 on axial opposite sides of the aperture 35 to facilitate diffusion of fluid passing through aperture 35 around the probe while flowing to the outlet orifice. The probe extends axially much closer to the housing orifice than the minimum axial distance of the threaded aperture 35 from the housing orifice and thus the aperture 35 opens directly to the probe axial intermediate portion 11A. The diameter of the housing orifice is many times smaller than the diameter of the housing intermediate bore portion 16. The regulator body end portion 19 is both internally and externally threaded and forms the pressure regulator outlet end portion. As may be noted each of the probe, the annular clearance space 15 and the housing portion 16 are axially elongated and advantageously are of axial dimensions many times greater than the diameters thereof.

The pressure regulator body has a bore E extending axially therethrough and has a threaded end portion 12 that opens to the housing aperture 35. A cap K has a threaded end portion 31 that is threaded into the end portion 37 of the regulator body bore which is axially opposite the threaded portion 19. The cap has a bore F extending axially therethrough, the bore F including a regulator inlet and a bore portion 34 mounting a filter 23. Bore F has a bore portion 34 that opens to a reduced diameter bore portion 24 and a larger diameter bore portion 28 that at one end opens to bore portion 24 to provide an annular shoulder 39 that includes a valve seat and an axial opposite end that opens to the regulator body main chamber 25. The main chamber is in part defined by regulator body bore portions 38, 42. Bore portion 42 opens to bore portion 37 and to the slightly smaller diameter bore portion 38 which in turn opens to the major base of a frustoconical bore portion 40. The minor base of portion 40 opens to a bore portion 41 which in turn opens to the internally threaded part of the housing end portion 19 which provides a regulator outlet.

A piston P has an enlarged diameter head 27 in the chamber 25 that is in fluid sealing relationship to body bore portion 38, a reduced diameter head 29 extending within cap bore portion 28 and an axially elongated stem 48 that at one end is joined to the enlarged diameter head and at the axial opposite end to the reduced diameter head. The reduced diameter head is of a transverse cross sectional area many times smaller than the corresponding cross sectional area of the enlarged diameter head, the reduced diameter head being of a maximum diameter many times smaller than the maximum diameter of the piston enlarged head. The piston includes a valve member 30 mounted by the reduced diameter head and has a frustoconical part having a minor base portion extendable a short distance into bore portion 24 and is abuttable against the valve seat at the juncture of the cap bore portions 24, 28 to block fluid flow from the regulator inlet and through the piston. That is, the piston portion which mounts the valve member for movement therewith is of a smaller diameter than bore portion 28 to provide a cap clearance space 43 to which the piston cross bore 33 in the piston reduce diameter head opens. The cross bore 32 in turn opens to an axial piston bore portion 44. Bore portion 44 in turn opens to bore portion 33 which opens through the piston enlarged head to the part of the body bore portion which is axially opposite the reduced diameter head and to the body frustoconical bore portion 40. Bore portion 38 is of an axial length to permit the piston moving away from shoulder 39 to a regulator maximum flow condition (position) while the annular shoulder 45 formed at the juncture of bore portions 38, 40 limits the movement of the piston axially away from the shoulder 39 to its maximum flow condition. A fluid seal 51 is mounted to the piston stem and in fluid sealing engagement with the cap bore portion 28 both in the regulator piston maximum fluid flow position and the regulator piston fluid flow blocking position. The fluid seal is mounted to the end portion of the stem adjacent to the cross bore but axially opposite the cross bore 32 from the valve member.

A vent aperture 52 opens to the main chamber 25 axially intermediate the piston enlarged head and the terminal transverse surface of the cap end portion 31 that in part defines the main chamber whereby air can freely flow into and out of the chamber 25 axially between the cap end portion 31 and the enlarged head portion as the piston axially moves between the regulator maximum free fluid flow condition and its closed position blocking fluid flow axially through the regulator.

A fitting 47 is removably threaded into the outlet portion 19 of the regulator body and has a small diameter orifice 58 that provides the pressure regulator outlet which restricts the flow rate of fluid discharging from regulator. Advantageously, the regulator orifice 58 is of a much smaller diameter than that of the housing orifice 14. The fitting may be exchangeable with a fitting with a different diameter orifice for different pressure ranges of fluid in the cylinder or other source of fluid 50 under high pressure. The regulator inlet may be connected by a suitable connector 49 that advantageously includes an on-off valve (not shown) to a conventional source 50 of fluid under high pressure, for example a bottle, a gas cylinder or other suitable source.

The regulator body bore, the cap bore, the fitting orifice, and piston bore portions 33, 42 have a central axis X—X that extends generally perpendicular to the housing central axis C—C.

When no fluid under pressure is applied to the regulator inlet, the piston may be in its fluid flow blocking position, or its regulator maximum flow position, or a position axially therebetween. Upon applying fluid under high pressure from source 50 to the regulator inlet 22 with the piston is in its fluid blocking position, the pressurized fluid in acting against the valve member minor base portion to which the bore portion 24 open, forces the piston to move away from the cap from the position shown in FIG. 2 (away from its fluid blocking position). Thereupon, fluid flows from the regulator inlet though a fluid flow path Y that includes through bore portion 24 into the clearance space 43, next through the piston to the frustoconical bore portion 40 and bore portion 41 to pass through the regulator orifice 58 to the housing clearance space 15 to pass in contact with the probe 11 and thence exit through the housing orifice 14.

The movement of the piston toward the shoulder 45 is limited by the pressure of the fluid in the control chamber N (between the piston enlarged head and the fitting) and this depends on the diameter of the fitting orifice and the pressure at the inlet. Since the transverse area of the valve member and the part of the piston subject to the pressure in cap bore portion 28 is much smaller than that of the piston enlarge head, during usual flow conditions, the pressure of the fluid in the control chamber N which is the axial part of the regulator body bore axially between axially adjacent transverse surfaces of the fitting and the piston enlarged head is many times lower than the regulator inlet pressure. When high fluid pressure is applied at the regulator inlet, the fluid pressure in the control chamber controls the axial movement of the piston in the control chamber between the maximum regulator flow position, the fluid flow blocking position and positions therebetween. Further, since the fluid has to flow through the fitting orifice, the pressure of the fluid in the housing fluid clearance space 15 is lower than that in the control chamber. In the event the pressure in the control chamber increases above the desired level, the increase of fluid pressure in the control chamber results in the piston moving toward the shoulder 39 whereby the valve member is moved to restrict the flow of fluid into bore portion 28 and in the event during use, the fluid pressure in the control chamber decreases below the desired level the piston moves axially toward the fitting to permit increase fluid flow through the piston. Accordingly, due to movement of the piston in the main chamber as a result of variations in pressure in the control chamber, the flow rate through the detector assembly is automatically limited regardless of the inlet pressure and a measurement of the moisture content in the gas being tested is obtained.

In the event when no fluid under pressure is applied to the regulator inlet and the piston abuts against the shoulder 45, upon applying pressurized fluid to the regulator, due to the fitting orifice restricting the rate of flow, pressure builds up in the control chamber to move the piston toward the shoulder 39 until the force acting to move the piston toward the shoulder 39 equalizes the force acting to move the piston way from shoulder 39.

Figure 4:
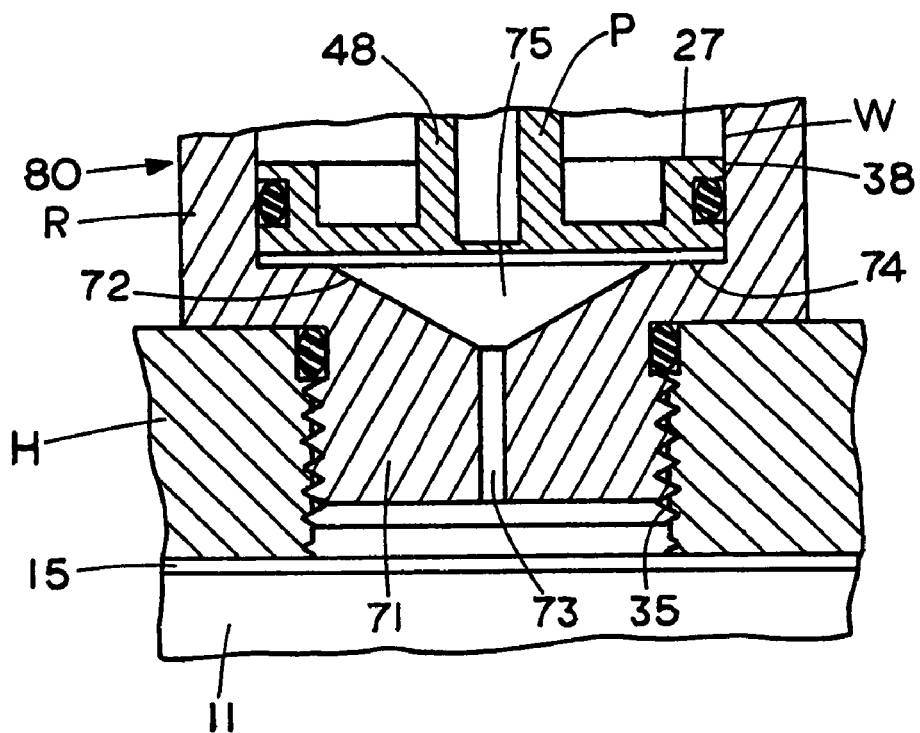
FIG. 4 is a view of a fragmentary portion of the second embodiment of the moisture detector assembly.

Referring to FIG. 4, the second embodiment of the invention, generally designate 80, is the same as the first embodiment other than for the regulator body and it does not include a fitting. Rather, the regulator body R of the second embodiment has an externally threaded end portion 71 threaded into the housing threaded opening 35. Further, the regulator body R has a bore W extending axially therethrough that is the same as bore E other than bore portion 38 opens through a frustoconical bore portion 72 which has its minor base opening to one end of an outlet orifice 73 that extends within the threaded end portion 71 to opens to the clearance space 15. The orifice 73 may be of the same diameter as orifice 58 and provide the same function as the orifice 58 of the first embodiment. Thus, the orifice 73 is machined in the regulator body R rather than being in a removable fitting such as in the first embodiment.

The major base of bore portion 72 opens to bore portion 38 to provide an annular shoulder 74 that limits the axial movement of the piston P to its maximum fluid flow position. The control chamber 75 of the second embodiment extends axially between the enlarged head 27 of the piston P and the minor base end of the frustoconical bore portion which opens to the orifice 73.

Figure 5:
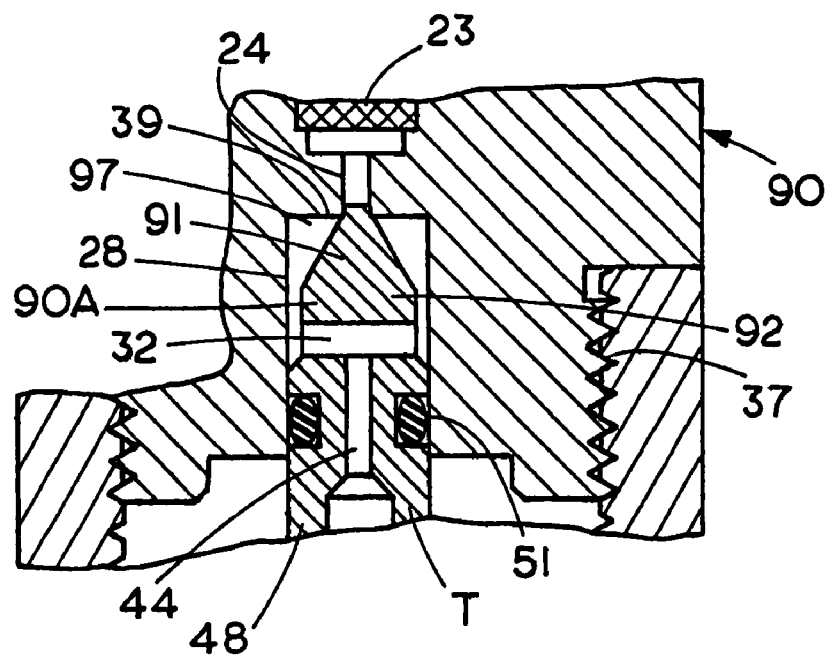
FIG. 5 is a view of a fragmentary portion of the third embodiment of the moisture detector assembly.

Referring to FIG. 5, the third embodiment of the invention, generally designate 90, is the same as the first embodiment other than for the reduced diameter head portion 90A of the piston T does not include a valve member 30, but rather has an end portion 91 that may be generally frustoconical having a major base joined to the head cylindrical portion 92 through which the cross bore 32 extends. The piston portions 91, 92 of the reduced diameter head are of smaller diameters than bore portion 28 to provide a cap clearance space 97 to which the piston cross bore 33 in the piston reduce diameter head opens. The cross bore 32 in turn opens to an axial piston bore portion 44 which extends within the piston stem 48. The frustoconical portion may have a minor base portion extendable into the cap bore portion 24 while being abuttable against the valve seat at the juncture of bore portion 24, 28 to block fluid flow from bore portion 24 to the clearance space 97. In any event the end portion 91 is of a different shape, for example conical, it is of a shape for blocking fluid flow from bore portion 24 to the clearance space when the piston T is in its fluid flow blocking position but permitting such fluid flow when the piston is in its maximum regulator flow position. The end portion 91 is axially opposite the enlarged diameter head (not shown) of the piston 90.

It is to be understood that the piston of the third embodiment may used in the regulator body of the second embodiment in place of the piston P. Further, it is to be understood whether the second embodiment or the third embodiment or a combination of the regulator body of second embodiment and the piston of third embodiment of the regulator are used in combination with a moisture detector 10 and housing H, the apparatus functions in a manner such as described with reference to the first embodiment.

As one example of the invention, but not otherwise as a limitation thereon, the inlet pressure may be from about 500 psi to 3500 psi while the pressure in the control chamber between the fitting and piston may be about 4 psi and in passing through the fitting orifice to the clearance space 15, the pressure in the clearance space would be less and close to atmospheric. In the above example, if the housing orifice 14 is blocked, the pressure in the housing clearance space builds up to about 6 psi and the pressure in the control chamber builds up whereby the piston moves to block further flow from bore portion 24 to bore portion 28. With this device there is a relatively short flow path and a small volume of gas has to flow through the device to obtain a measurement of the moisture content. As a result, relatively little fluid has to flow through the assembly to purge the fluid in the assembly when starting to use the assembly when connected to one source and thereafter, using the assembly when connected to another source. By changing the regulator fitting, the range of fluid flow may be changed.

What is claimed is:

1. A moisture detector assembly comprising,
a moisture detector having an axially elongated probe;
a housing having an axial bore extending therethrough that includes a first end portion for having the moisture detector mounted thereto, an elongated intermediate portion for having the probe extending therein and a second end portion providing a housing outlet orifice, wherein the probe and housing bore intermediate portion provide an annular housing clearance space that opens to the housing outlet orifice;
the housing having a regulator opening that opens into the housing clearance space; and
a pressure regulator mounted to the housing at the regulator opening, the pressure regulator including a body having an axial bore extending therethrough; and
the body's axial bore having a first end portion that provides an outlet that opens through the regulator opening to the housing clearance space, a coaxial intermediate portion of a greater diameter than the body axial bore's first end portion, a coaxial second end portion, and a first means mounted to the regulator body for closing the body axial bore's second end portion to fluid flow;
wherein said first means comprises:
a high pressure inlet and a fluid passage fluidly connecting the inlet to the body axial bore's intermediate portion, the fluid passage including a first bore portion coaxially aligned with the body axial bore's first end portion; and
a second means extending within the body axial bore's intermediate portion for controlling the flow of fluid from the fluid passage to the body axial bore's first end portion to provide fluid at the regulator outlet at a controlled pressure that is reduced from the pressure of the fluid in the fluid passage.

2. The moisture detector assembly of claim 1 wherein:
the housing bore has a central axis;
the body has a central axis that extends at substantially right angles to the housing's bore axis; and
the probe has an axial intermediate portion and the pressure regulator's opening opens directly to the probe's axial intermediate portion.

3. The moisture detector assembly of claim 1 wherein:
the housing opening is threaded; and
the body has a threaded end portion threadable into the regulator opening for mounting the pressure regulator to the housing; and
wherein the second means includes a fitting having an orifice extending therethrough that opens to one of the regulator opening and the housing clearance space for having fluid flow therethrough into the housing clearance space, the fitting being removably mounted to the pressure regulator at the body bore's first end portion to extend within the body's bore.

4. The moisture detector assembly of claim 1 wherein:
the housing clearance space extends in axial opposite directions away from the opening of the regulator opening into the housing clearance space;
the second means includes a fitting having an orifice extending therethrough that opens into one of the regulator opening and the housing clearance space for having fluid flow therethrough into the housing clearance space, the fitting being mounted to the body to extend within the body's axial bore; and
the fitting's orifice is of a smaller diameter than the housing's outlet orifice.

5. The moisture detector assembly of claim 1 wherein the first means in conjunction with the regulator body provides:
a main chamber in the body axial bore's intermediate portion with the body axial bore's first end portion including a frustoconical bore portion having a major base opening to the main chamber and a minor base, and
an orifice having one end opening to the minor base and an opposite end opening into one of the housing clearance space and to the regulator opening.

6. The moisture detector assembly of claim 1 wherein:
the first means in conjunction with the body provides a main chamber in the body axial bore's intermediate portion and
the second means includes:
a fitting having an orifice extending therethrough that opens to one of the regulator opening and the housing clearance space for having fluid flow therethrough into the housing clearance space, the fitting being mounted to the body to extend within the body's bore; and
a piston means for controlling the pressure of the fluid flowing from the fluid passage's first bore portion to the fitting orifice, the piston means being mounted for axial movement in the main chamber and the fluid passage's first bore portion to provide a control chamber axially between the fitting and the piston means, the piston means extending within the body's bore for movement between a maximum regulator fluid flow position and a fluid flow blocking position and being between the fluid passage's first bore portion and the fitting to in conjunction with the fitting form a control chamber.

7. The moisture detector assembly of claim 6 wherein:
the fluid passage includes a second bore portion that fluidly connects the inlet to fluid passage's first bore portion and opens to the passage's first bore portion to form a valve seat; and
the piston means includes:
an enlarged diametric head portion in fluid sealing relationship with the body and to which the control chamber opens and
an axially opposite reduced diameter head means extending within the fluid passage's first bore portion for, in the piston means fluid flow blocking position, abutting against the valve seat to block fluid flow from the fluid passage's second bore portion to the fluid passage's first bore portion, the reduced diameter head means in conjunction with the body providing a regulator clearance space in fluid communication with the valve seat when the piston means is out of its fluid flow blocking position.

8. The moisture detector assembly of claim 7 wherein:
the piston means includes a fluid passage that opens through the reduced diameter head means to the regulator clearance space and to the control chamber in both of the piston means maximum regulator flow position and fluid flow blocking position; and
the maximum diameter of the reduced diameter head means is several times smaller than the maximum diameter of the enlarged diameter head portion whereby the fluid pressure in the control chamber controls the axial movement of the piston means when high pressure is applied to the inlet.

9. A moisture detector assembly comprising,
a moisture detector having an axially elongated probe;
housing having a bore extending therethrough, the housing bore having a central axis and including a first end portion for having the moisture detector mounts thereto, an elongated intermediate portion for having the probe extending therein and a second end portion providing a housing outlet orifice
the probe and the bore's intermediate portion providing a housing annular clearance space that opens to the housing orifice;
the housing having a regulator opening that opens into the housing clearance space; and
a pressure regulator mounted to the housing and having a high pressure inlet, an outlet, a fluid flow path fluidly connecting the inlet to the outlet and a first means in the fluid flow path for controlling the pressure of the fluid flowing through the outlet at a substantially reduction from the pressure of fluid at the inlet and at a level for being substantially atmospheric in the housing annular clearance space with fluid flowing through the housing's outlet orifice; and
wherein the pressure regulator includes a regulator body having the outlet and is mounted to the housing to have the outlet open through the regulator opening into the housing clearance space.

10. The moisture detector assembly of claim 9 wherein:
the pressure regulator includes a body having a bore extending axially therethrough that at least in part defines the fluid flow path, the body's bore having a central axis extending at least nearly at right angles to the housing's bore central axis; and
the body's bore has a first end portion opening into the housing clearance space.

11. The moisture detector assembly of claim 10 wherein:
the regulator includes a cap mounted to the body and having a bore that at least in part forms the fluid flow path and opens into the body's bore to in conjunction therewith form a main chamber;
the cap having the inlet with the cap's bore opening thereto;
the first means includes:
a fitting mounted in the body bore's first end portion and having an orifice opening to the housing clearance space and toward the main chamber, and
piston means for automatically controlling the pressure of the fluid flowing from the cap's bore to the fitting orifice, the piston means being mounted for axial movement in the main chamber and the cap's bore to provide a control chamber axially between the fitting and the piston means; and wherein
the fluid flow path extends through the cap's bore and the fitting orifice.

12. The moisture detector assembly of claim 9 wherein:
the body includes a bore having a central axis and extending axially through the regulator body, the body's bore having a first end portion opening to the housing clearance space and an axially opposite second end portion;
the pressure regulator includes a cap mounted to the body and having the high pressure inlet and a bore opening to the inlet and axially toward the body's bore first end portion; and
the first means includes a piston means for controlling the flow of fluid from the cap's bore to the body bore's first end portion, the piston means being movable between a maximum regulator fluid flow position and a fluid flow blocking position; and wherein
the fluid flow path is at least in part is defined by the piston means, the body's bore and the cap's bore.

13. The moisture detector assembly of claim 12 wherein:
the body bore's second end portion is of a diameter many times greater than the body bore's first end portion;
the cap's bore has a first end portion opening into the inlet and a second end portion opening to the body bore's second end portion and opening to the cap bore's first end portion to form a valve seat, the cap bore's second end portion being of a diameter many times smaller than the diameter of the body bore's second end portion; and
the piston means includes:
an enlarged diameter head in fluid sealing relationship with the body bore's second end portion,
a reduced diameter head extending within the cap bore's second portion and
a stem extending axially between the piston enlarged diameter head and the reduced diameter head, the stem being in fluidly sealing relationship to the cap's second end portion axially between the reduced diameter head and the enlarged diameter head in both the piston means maximum fluid flow position and the fluid flow blocking position.

14. The moisture detector assembly of claim 13 wherein:
the reduced diameter head is of a smaller diameter than the cap bore's second end portion to provide a cap annular clearance space and includes a portion remote from the enlarged diameter head portion for abutting against the valve seat in the piston means fluid flow blocking position to block fluid flow from the cap bore's first portion to the cap annular clearance space, and
the fluid flow path includes a fluid passage that opens to the cap annular clearance space and through the enlarged diameter head to the body's bore between the enlarged diameter head and the body's bore first end portion.

15. The moisture detector assembly of claim 13 wherein:
the reduced diameter head is of a smaller diameter than the cap's second bore portion to provide a cap annular clearance space;
the piston means includes a valve member mounted to the reduced diameter head for abutting against the valve seat in the piston means fluid flow blocking position to block fluid flow from the cap bore's first end portion to the cap annular clearance space; and
the fluid flow path includes a fluid passage that opens to the cap clearance space and through the enlarged diameter head to the body's bore between the enlarged diameter head and the body's bore first end portion.

16. The moisture detector assembly of claim 15 wherein:
the first means includes a fitting mounted in the body bore's first end portion that in combination with the piston enlarged diameter head portion provides a control chamber in the body's bore between the piston enlarged diameter head portion and the fitting; and
the fitting has an orifice opening to the control chamber and is of a diameter many times smaller than the minimum diameter of the control chamber and the diameter of the enlarged diameter head, the fluid flow path in part being defined by the fitting orifice.

17. A moisture detector assembly comprising,
a moisture detector having an axially elongated probe;
a housing having an axial bore that includes a first end portion whereat the moisture detector is mounted to the housing, an elongated intermediate portion for having the probe extending therein and a second end portion providing a housing orifice wherein the probe and housing bore's intermediate portion provide an annular housing clearance space that opens to the housing outlet orifice;
the housing having a regulator opening that opens to the housing clearance space;
and a pressure regulator mounted to the housing, the pressure regulator having a body that has a first end portion, an axial intermediate portion and an axial opposite second end portion with an axial bore extending through body's first, intermediate and second body portions;
the body's axial bore having a first end portion opening through the regulator opening into the housing clearance space, an axial intermediate portion extending within the body's intermediate portion and being of a greater diameter than the body axial bore's first end portion and a second end portion;
a cap mounted to the body for closing the body axial bore's second end portion and in combination with the body forming a main chamber;
the cap having a high pressure inlet and a bore fluidly connecting the inlet to the main chamber;
a fitting mounted in the body axial bore's first end portion and having an orifice that opens to one of the housing clearance space and the body axial bore's first end portion for conducting fluid therethrough to flow into the housing clearance space; and
a piston mounted to extend within the main chamber and in combination with the fitting form a control chamber, the piston being axially movable between a position permitting maximum regulator fluid flow from the cap's bore to the control chamber, a fluid flow blocking position and positions between the piston's blocking position and maximum flow positions, and in response to the fluid pressure in the control chamber, being moved between the piston's positions when high fluid pressure is applied at the inlet to maintain the pressure of fluid flowing through the housing orifice at nearly atmospheric pressure.

18. The moisture detector assembly of claim 17 wherein:
the piston has an enlarged diametric head that is axially moveable in the main chamber and is in fluid sealing with the body axial bore's intermediate portion to in combination with the fitting and the regulator body form the control chamber;
the cap's bore has a first bore portion opening to the inlet and a second bore portion of a larger diameter than the cap's first bore portion and opens thereto to provide a valve seat, the cap's second bore portion opening to the main chamber; and
the piston in its fluid flow blocking position has means abuttable against the valve seat for blocking fluid flow from the cap bore's first end portion to the cap bore's second end portion.

19. The moisture detector assembly of claim 18 wherein:
the piston enlarged diametric head is in fluid sealing relationship with the body axial bore's intermediate portion; and
the piston includes a reduced diameter head extending within the cap bore's second portion and a stem extending axially between the piston enlarged diameter head and the reduced diameter head, the stem being in fluidly sealing relationship to the cap bore's second end portion axially between the reduced diameter head and the enlarged diameter head in both the piston maximum flow position and the fluid flow blocking position;

the reduced diameter head is of a smaller diameter than the cap bore's second portion to provide a cap annular clearance space; and the piston comprises:
- a valve member mounted to the reduced diameter head for abutting against the valve seat in the piston's fluid flow blocking position to block fluid flow from the cap's first bore portion to the cap clearance space; and
- a fluid passage that opens to the cap's clearance space and through the enlarged diameter head to the control chamber.

20. The moisture detector assembly of claim 19 wherein:

the regulator bore includes a frustoconical bore portion having a major base opening to the regulator bore's intermediate portion to provide an annular shoulder that limits the axial movement of the piston to its maximum flow position and a minor base opening to the regulator bore's first end portion; and the control chamber is at least in part defined by the frustoconical bore portion.

* * * * *